United States Patent
Hashimoto et al.

(10) Patent No.: US 10,671,074 B2
(45) Date of Patent: Jun. 2, 2020

(54) CONTROL SYSTEM FOR WORK VEHICLE, METHOD, AND WORK VEHICLE

(71) Applicant: KOMATSU LTD., Tokyo (JP)

(72) Inventors: Kazuhiro Hashimoto, Tokyo (JP); Kenjiro Shimada, Tokyo (JP); Kazuhiko Hayashi, Tokyo (JP); Yousuke Yamaguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 182 days.

(21) Appl. No.: 15/754,435

(22) PCT Filed: Aug. 8, 2017

(86) PCT No.: PCT/JP2017/028794
§ 371 (c)(1),
(2) Date: Feb. 22, 2018

(87) PCT Pub. No.: WO2019/030828
PCT Pub. Date: Feb. 14, 2019

(65) Prior Publication Data
US 2019/0049973 A1 Feb. 14, 2019

(51) Int. Cl.
*E02F 3/84* (2006.01)
*G05D 1/02* (2020.01)
*E02F 3/76* (2006.01)

(52) U.S. Cl.
CPC ......... *G05D 1/0212* (2013.01); *E02F 3/7618* (2013.01); *E02F 3/841* (2013.01); *E02F 3/844* (2013.01); *G05D 2201/0202* (2013.01)

(58) Field of Classification Search
CPC ....... E02F 3/7609; E02F 3/7618; E02F 3/841; E02F 3/844
(Continued)

(56) References Cited

U.S. PATENT DOCUMENTS

| | | | | |
|---|---|---|---|---|
| 4,273,196 A | * | 6/1981 | Etsusaki | E02F 3/841 172/4.5 |
| 4,282,933 A | * | 8/1981 | Suganami | E02F 9/2029 172/4.5 |

(Continued)

FOREIGN PATENT DOCUMENTS

| JP | 7-26586 A | 1/1995 |
|---|---|---|
| JP | 2012-36726 A | 2/2012 |

OTHER PUBLICATIONS

The Office Action for the corresponding Canadian application No. 2,996,146, dated Nov. 26, 2018.
(Continued)

*Primary Examiner* — Gary S Hartmann
(74) *Attorney, Agent, or Firm* — Global IP Counselors, LLP (57) ABSTRACT

A control system for a work vehicle includes a sensor and a controller. The sensor outputs a signal indicating an actual traveling direction of the work vehicle. The controller communicates with the sensor. The controller is programmed so as to execute the following processing. The controller acquires the actual traveling direction of the work vehicle. The controller sets the actual traveling direction as a target traveling direction when a condition that indicates that the work vehicle has started straight travel has been met. The controller calculates a bearing difference between the target traveling direction and the actual traveling direction. The controller moves the work implement at a target tilt angle corresponding to the bearing difference so as to reduce the bearing difference.

9 Claims, 9 Drawing Sheets

(58) Field of Classification Search
USPC .................................................. 172/4.5, 779
See application file for complete search history.

(56) References Cited

U.S. PATENT DOCUMENTS

| | | | |
|---|---|---|---|
| 5,462,122 A | 10/1995 | Yamamoto et al. | |
| 5,503,232 A | 4/1996 | Matsushita et al. | |
| 5,538,084 A * | 7/1996 | Nakayama | E02F 3/844 |
| | | | 172/2 |
| 5,819,190 A * | 10/1998 | Nakagami | E02F 3/844 |
| | | | 701/50 |
| 5,862,868 A * | 1/1999 | Yamamoto | E02F 3/844 |
| | | | 172/2 |
| 6,062,317 A | 5/2000 | Gharsalli et al. | |
| 7,058,495 B2 * | 6/2006 | Budde | E02F 3/845 |
| | | | 172/819 |
| 9,014,923 B2 * | 4/2015 | Park | E02F 9/2004 |
| | | | 172/810 |
| 9,371,898 B2 * | 6/2016 | Schulte | E02F 9/2246 |
| 9,587,369 B2 * | 3/2017 | Fletcher | E02F 9/2041 |
| 2013/0255977 A1 * | 10/2013 | Braunstein | E02F 3/764 |
| | | | 172/4.5 |
| 2014/0343800 A1 | 11/2014 | Nelson et al. | |
| 2015/0165856 A1 | 6/2015 | Horstman | |
| 2018/0038067 A1 * | 2/2018 | Hashimoto | E02F 3/847 |
| 2018/0038068 A1 * | 2/2018 | Hashimoto | E02F 3/847 |
| 2018/0038069 A1 * | 2/2018 | Hashimoto | E02F 3/847 |
| 2018/0038070 A1 * | 2/2018 | Hashimoto | E02F 3/847 |
| 2018/0038082 A1 * | 2/2018 | Hashimoto | E02F 3/7609 |
| 2018/0355587 A1 * | 12/2018 | Hashimoto | G05D 1/0278 |
| 2019/0078298 A1 * | 3/2019 | Ishibashi | E02F 9/2045 |
| 2019/0218745 A1 * | 7/2019 | Hashimoto | E02F 3/43 |
| 2019/0218747 A1 * | 7/2019 | Hashimoto | E02F 3/43 |

OTHER PUBLICATIONS

The Examination report No. 1 for the corresponding Australian application No. 2017311613, dated May 3, 2019.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2017/028794, filed on Aug. 8, 2017.

BACKGROUND

Field of Invention

The present invention relates to a control system for a work vehicle, a method, and a work vehicle.

Description of the Related Art

When a work vehicle travels along a straight path that is a target, the work vehicle may deviate from the straight path due to an uneven force from the ground surface acting on a work implement such as a blade. Accordingly, a technique is known in the prior art that corrects the traveling direction of the work implement when the work vehicle deviates from the straight path.

For example in Japanese Patent Laid-open No. 2012-36726, a controller decides a straight path over which the work vehicle passes. The controller controls the tilt angle of the work implement so that the work vehicle returns to the straight path when displacement of the work vehicle from the straight path is detected.

SUMMARY

In Japanese Patent Laid-open No. 2012-36726 for example, when the work vehicle is displaced to the left from the straight path, the traveling direction of the work vehicle is changed to the right thereby returning the work vehicle to the straight path. When the work vehicle is displaced to the right from the straight path, the traveling direction of the work vehicle is changed to the left thereby returning the work vehicle to the straight path. Therefore, the work vehicle travels while repeatedly turning to the left and right. As a result, there is a concern that the work efficiency will drop due to the work vehicle.

An object of the present invention is to cause a work vehicle to travel with high accuracy in the target traveling direction and suppress a reduction in work efficiency while improving straight travel stability.

A first aspect of the present invention is a control system for a work vehicle including a work implement, the control system includes a sensor and a controller. The sensor outputs a signal indicating an actual traveling direction of the work vehicle. The controller communicates with the sensor. The controller is programmed to execute the following processing. The controller acquires the actual traveling direction of the work vehicle. The controller sets the actual traveling direction as a target traveling direction when conditions that show that the work vehicle has started straight travel are met. The controller calculates a bearing difference between the target traveling direction and the actual traveling direction. The controller moves the work implement by a target tilt angle corresponding to the bearing difference so as to reduce the bearing difference.

A second aspect of the present invention is a method executed by a controller in order to control a traveling direction of a work vehicle including a work implement, the method including the following processing. A first process includes acquiring an actual traveling direction of the work vehicle. A second process includes determining whether a condition which indicates that the work vehicle has started straight travel has been met. A third process includes setting the actual traveling direction as a target traveling direction when the condition has been met. A fourth process includes calculating a bearing difference between the target traveling direction and the actual traveling direction. A fifth process includes moving the work implement by a target tilt angle corresponding to the bearing difference so as to reduce the bearing difference.

A third aspect of the present invention is a work vehicle including a work implement, a sensor, and a controller. The sensor outputs a signal indicating the actual traveling direction of the work vehicle. The controller communicates with the sensor. The controller is programmed to execute the following processing. The controller acquires the actual traveling direction of the work vehicle. The controller sets the actual traveling direction as a target traveling direction when a condition that indicates that the work vehicle has started straight travel is met. The controller calculates a bearing difference between the target traveling direction and the actual traveling direction. The controller moves the work implement by a target tilt angle corresponding to the bearing difference so as to reduce the bearing difference.

Effect of the Invention

In the present invention, the traveling direction of the work vehicle is corrected by moving the work implement so as to reduce the bearing difference. As a result, the degree of turning while traveling for correcting the traveling direction is less in comparison to when the work vehicle is returned to the original straight path. Consequently, the work vehicle is able to travel in the target traveling direction with high accuracy and a reduction in work efficiency can be suppressed.

DETAILED DESCRIPTION OF EMBODIMENT(S)

Figure 1:
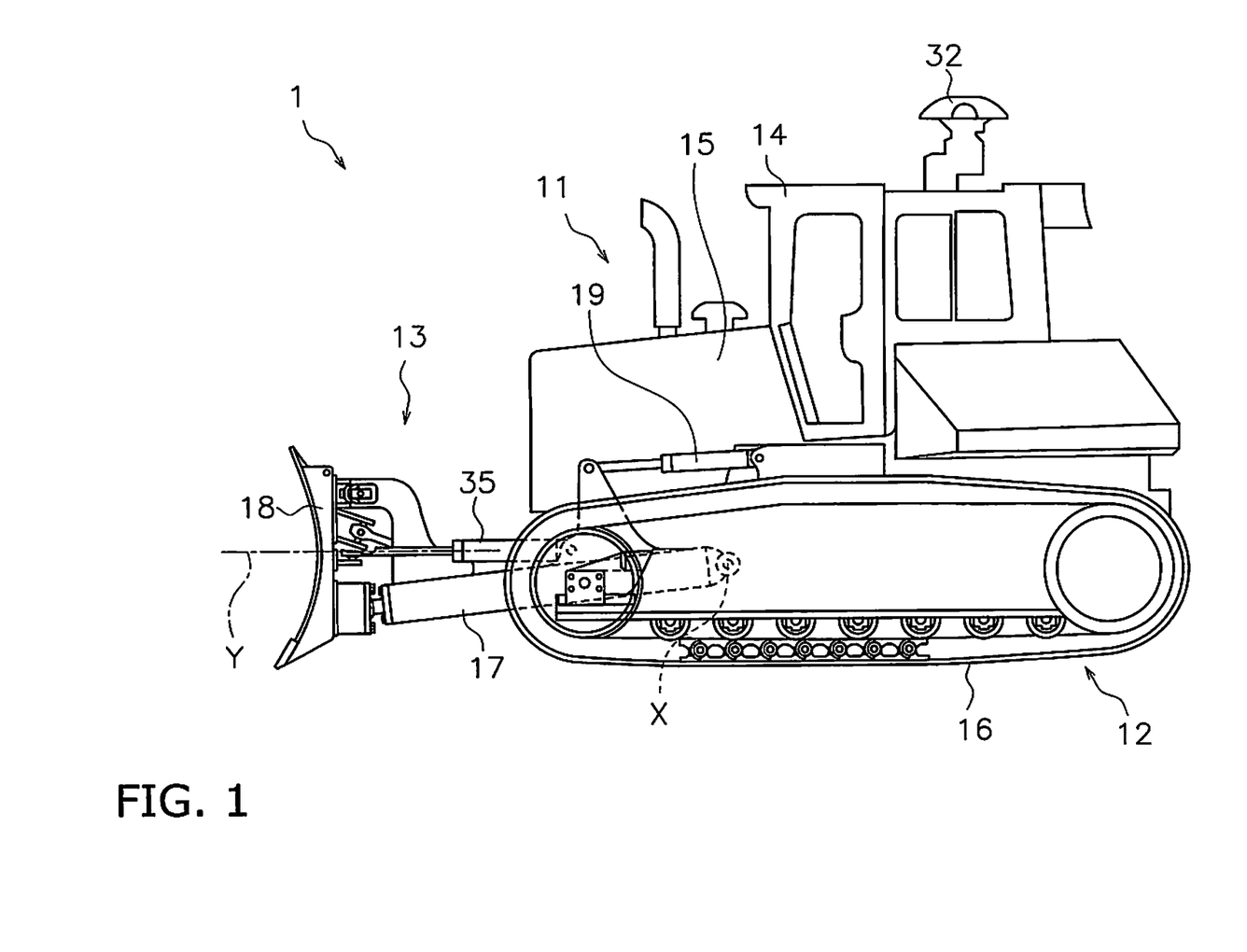
FIG. 1 is a side view of a work vehicle according to an embodiment.

A work vehicle 1 according to an embodiment shall be explained in detail with reference to the drawings. FIG. 1 is a side view of the work vehicle 1 according to an embodiment. The work vehicle 1 is a bulldozer according to the present embodiment. The work vehicle 1 includes a vehicle body 11, a travel device 12, and a work implement 13.

The vehicle body 11 has an operating cab 14 and an engine compartment 15. An operator's seat that is not illustrated is disposed inside the operating cab 14. The engine compartment 15 is disposed in front of the operating cab 14. The travel device 12 is attached to a bottom part of the vehicle body 11. The travel device 12 includes a pair of left and right crawler belts 16. Only the left crawler belt 16 is depicted in FIG. 1. The work vehicle 1 travels due to the rotation of the crawler belts 16. The travel of the work vehicle 1 may be in the form of automated travel, semi-automated travel, or travel due to operations by an operator.

The work implement 13 is attached to the vehicle body 11. The work implement 13 includes a lift frame 17, a blade 18, a hydraulic lift cylinder 19, and left and right hydraulic tilt cylinders 35 and 36.

The lift frame 17 is attached to the vehicle body 11 in a manner that allows movement up and down centered on an axis X that extends in the vehicle width direction. The lift frame 17 supports the blade 18. The blade 18 is disposed in front of the vehicle body 11. The blade 18 moves up and down accompanying the up and down movement of the lift frame 17.

The lift cylinder 19 is coupled to the vehicle body 11 and the lift frame 17. The lift frame 17 rotates up and down centered on the axis X due to the extension and retraction of the lift cylinder 19.

The left and right tilt cylinders 35 and 36 are coupled to the vehicle body 11 and the blade 18. The left tilt cylinder 35 is connected to the blade 18 at a position on the blade 18 further to the left than the center in the vehicle width direction. The right tilt cylinder 36 (see FIG. 2) is connected to the blade 18 at a position on the blade 18 further to the right than the center in the vehicle width direction. Due to the extension and retraction of the left and right tilt cylinders 35 and 36, the blade 18 rotates to the left and right centered on an axis Y that extends in roughly the front-back direction.

Figure 2:
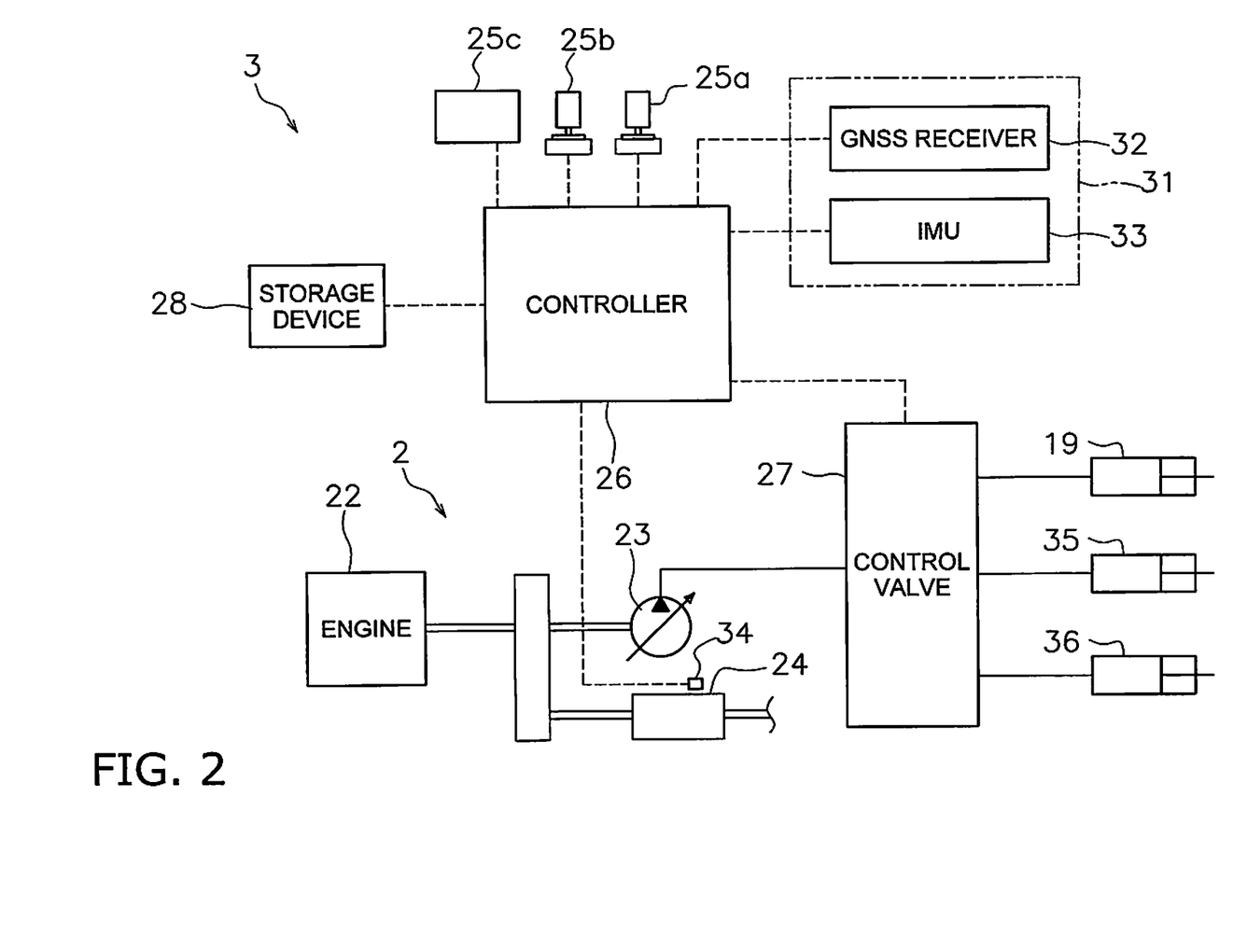
FIG. 2 is a block diagram illustrating a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST) for example. Alternatively, the power transmission device 24, for example, may be a transmission including a torque converter or a plurality of speed change gears.

The control system 3 includes an output sensor 34 that detects the output of the power transmission device 24. The output sensor 34 includes, for example, a rotation speed sensor or a pressure sensor. When the power transmission device 24 is an HST that includes a hydraulic motor, the output sensor 34 may be a pressure sensor that detects the driving hydraulic pressure of the hydraulic motor. The output sensor 34 may be a rotation sensor that detects the output rotation speed of the hydraulic motor. When the power transmission device 24 includes a torque converter, the output sensor 34 may be a rotation sensor that detects the output rotation speed of the torque converter. A detection signal that indicates a detection value of the output sensor 34 is output to a controller 26.

The control system 3 includes a first operating device 25a, a second operating device 25b, an input device 25c, the controller 26, a storage device 28, and a control valve 27. The first operating device 25a, the second operating device 25b, and the input device 25c are disposed in the operating cab 14. The first operating device 25a is a device for operating the travel device 12. The first operating device 25a receives an operation from the operator for driving the travel device 12 and outputs an operation signal corresponding to the operation. The second operating device 25b is a device for operating the work implement 13. The second operating device 25b receives an operation from the operator for driving the work implement 13 and outputs an operation signal corresponding to the operation. The first operating device 25a and the second operating device 25b include, for example, an operating lever, a pedal, and a switch and the like. The first operating device 25a or the second operating device 25b is used in a steering operation of the work vehicle 1.

The first operating device 25a is provided so as to be operable in a forward movement position, a reverse movement position, and a neutral position. An operation signal indicating the position of the first operating device 25a is output to the controller 26. The controller 26 controls the travel device 12 or the power transmission device 24 so that the work vehicle 1 moves forward when the operating position of the first operating device 25a is in the forward movement position. The controller 26 controls the travel device 12 or the power transmission device 24 so that the work vehicle 1 moves in reverse when the operating position of the first operating device 25a is in the reverse movement position.

Further, the first operating device 25a is provided so as to be operable in a left turn position and a right turn position. The controller 26 controls the travel device 12 or the power transmission device 24 so that the work vehicle 1 turns left when the operating position of the first operating device 25a is in the left turn position. The controller 26 controls the travel device 12 or the power transmission device 24 so that the work vehicle 1 turns right when the operating position of the first operating device 25a is in the right turn position. For example, the controller 26 causes the work vehicle 1 to turn left or right by driving only one of the right and left crawler belts 16.

The second operating device 25b is provided so as to be operable in a raising position, a lowering position, and a neutral position. An operation signal indicating the position of the second operating device 25b is output to the controller 26. The controller 26 controls the lift cylinder 19 so as to raise the blade 18 when the operating position of the second operating device 25b is in the raising position. The controller 26 controls the lift cylinder 19 so as to lower the blade 18 when the operating position of the second operating device 25b is in the lowering position.

Figure 3:
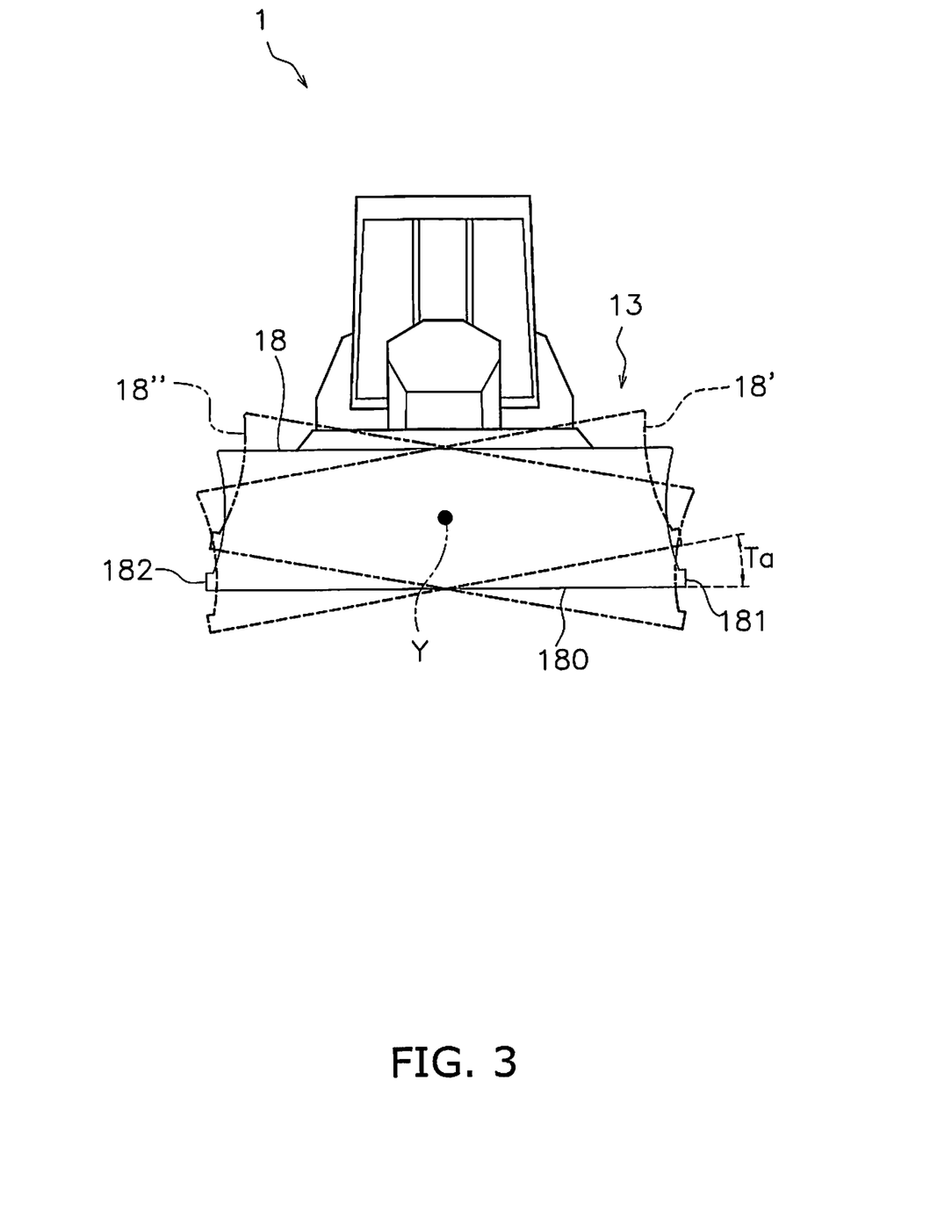
FIG. 3 is front view of the work vehicle.

Further, the second operating device 25b is provided so as to be operable in a left tilt position and a right tilt position. The controller 26 controls the tilt cylinders 35 and 36 so that the blade 18 performs a left tilt motion when the second operating device 25b is in the left tilt position. As illustrated in FIG. 3, the right tilt motion is a motion in which the blade 18 rotates around the axis Y so that a left edge 181 of the blade 18 is positioned higher than a right edge 182 (blade 18' in FIG. 3). The controller 26 controls the tilt cylinders 35 and 36 so that the blade 18 performs a right tilt motion when the second operating device 25b is in the right tilt position. As illustrated in FIG. 3, the left tilt motion is a motion in which the blade 18 rotates around the axis Y so that the right edge 182 of the blade 18 is positioned higher than the left edge 181 (blade 18" in FIG. 3). When the blade 18 is in contact with the ground surface such as during dozing work, the work vehicle 1 turns right when the blade 18 performs the right tilt motion and to the left when the blade 18 performs the left tilt motion. During dozing work, the work vehicle 1 is operated so as to travel straight due to the tilt motions of the blade 18 from the point of view of work efficiency.

As illustrated in FIG. 3, a tilt angle Ta is the angle of a lower edge 180 of the blade 18 with respect to the horizontal direction. In the present embodiment, a tilt angle that is a positive value indicates the left tilt motion, and a tilt angle that is a negative value indicates the right tilt motion. However, a tilt angle that is a positive value may indicate the right tilt motion, and a tilt angle that is a negative value may indicate the left tilt motion.

The input device 25c is a device for inputting a setting for automatic control of the work implement 13 as explained below. The input device 25c is, for example, a touch panel display. However, the input device 25c may be another type of device such as a mouse or trackball or other pointing device, a switch, or a keyboard and the like. The input device 25c receives an operation from the operator and outputs an operation signal corresponding to the operation.

The controller 26 is programmed so as to control the work vehicle 1 on the basis of acquired data. The controller 26 includes, for example, a processing device (processor) such as a CPU. The controller 26 acquires operation signals from the first operating device 25a, the second operating device 25b, and the input device 25c. The controller 26 controls the control valve 27 on the basis of the operation signals.

The control valve 27 is a proportional control valve and is controlled by a command signal from the controller 26. The control valve 27 is disposed between the hydraulic pump 23 and hydraulic actuators such as the lift cylinder 19 and the tilt cylinders 35 and 36. The control valve 27 controls the flow rate of the hydraulic fluid supplied from the hydraulic pump 23 to the lift cylinder 19 and the tilt cylinders 35 and 36.

The controller 26 generates a command signal for the control valve 27 so that the blade 18 moves in accordance with the abovementioned operations of the second operating device 25b. As a result, the lift cylinder 19 is controlled in accordance with the operation amount of the second operating device 25b. Alternatively, the tilt cylinders 35 and 36 are controlled in accordance with the operation amount of the second operating device 25b. The control valve 27 may be a pressure proportional control valve. Alternatively, the control valve 27 may be an electromagnetic proportional control valve.

As illustrated in FIG. 2, the control system 3 includes a positional sensor 31. The positional sensor 31 measures the position of the work vehicle 1. The positional sensor 31 includes a global navigation satellite system (GNSS) receiver 32 and an IMU 33. The GNSS receiver 32 is a receiving apparatus for a global positioning system (GPS), for example. An antenna of the GNSS receiver 32 is disposed on the operating cab 14. The GNSS receiver 32 receives a positioning signal from a satellite, computes the position of the antenna from the positioning signal, and generates vehicle body position data. The controller 26 acquires the vehicle body position data from the GNSS receiver 32. The controller 26 derives the traveling direction and the vehicle speed of the work vehicle 1 from the vehicle body position data.

The IMU 33 is an inertial measurement unit. The IMU 33 acquires vehicle body inclination angle data. The vehicle body inclination angle data includes the angle (pitch angle) relative to horizontal in the vehicle front-back direction and the angle (roll angle) relative to horizontal in the vehicle lateral direction. The controller 26 acquires the vehicle body inclination angle data from the IMU 33.

The storage device 28 includes, for example, a memory and an auxiliary storage device. The storage device 28 may be a RAM or a ROM, for example. The storage device 28 may also be a semiconductor memory or a hard disk and the like. The storage device 28 is an example of a non-transitory computer-readable recording medium. The storage device 28 records computer commands that are executable by the processor and that are used for controlling the work vehicle 1.

In the present embodiment, the controller 26 executes a straight travel correction control for correcting the traveling direction of the work vehicle 1. In the straight travel correction control, the controller 26 decides a target traveling direction of the work vehicle 1 and corrects the traveling direction of the work vehicle 1 when the actual traveling direction of the work vehicle 1 deviates from the target traveling direction. The following is an explanation of the processing for the straight travel correction control.

Figure 4:
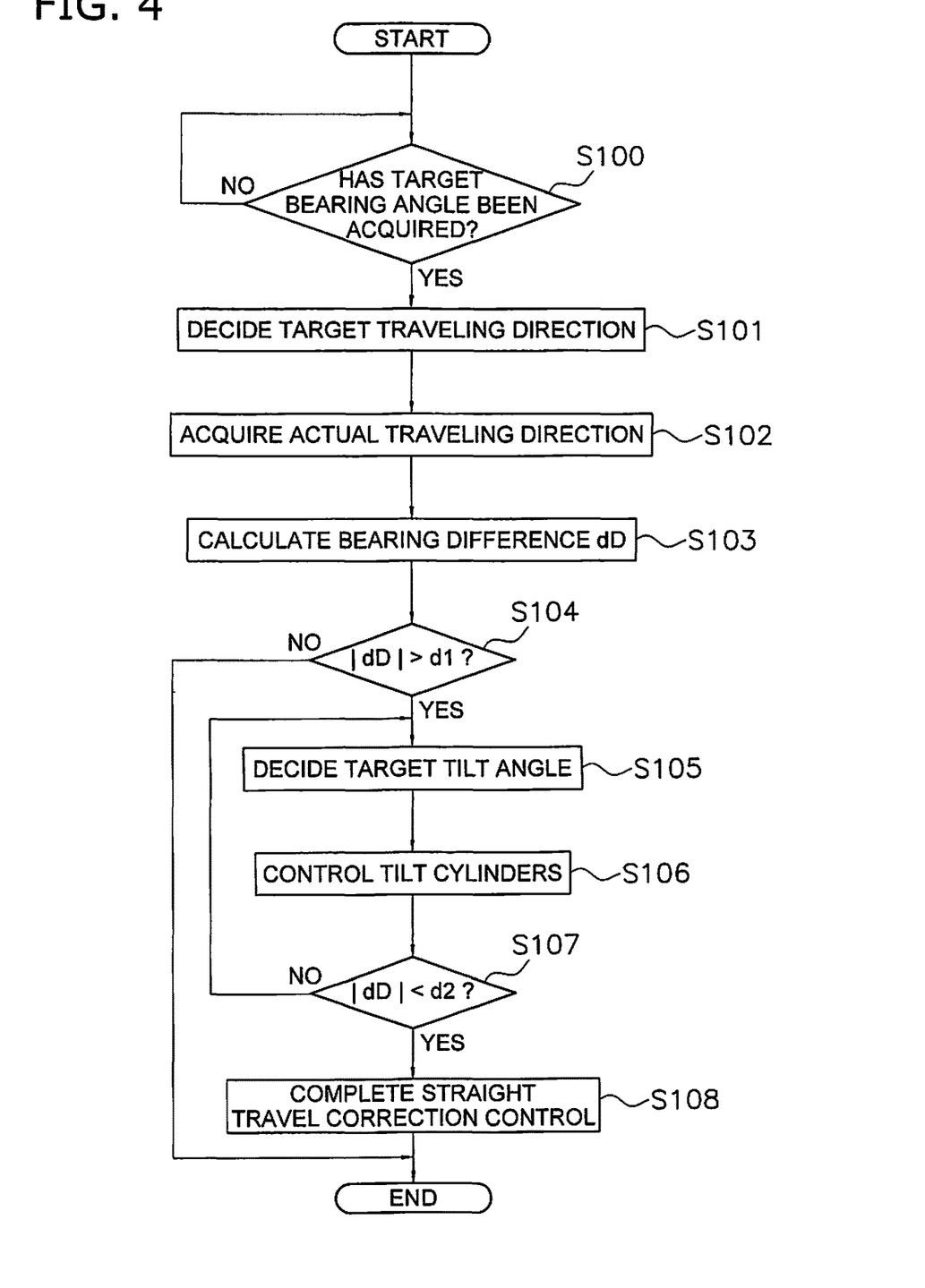
FIG. 4 is a flow chart of processing for straight travel correction control.
Figure 5:
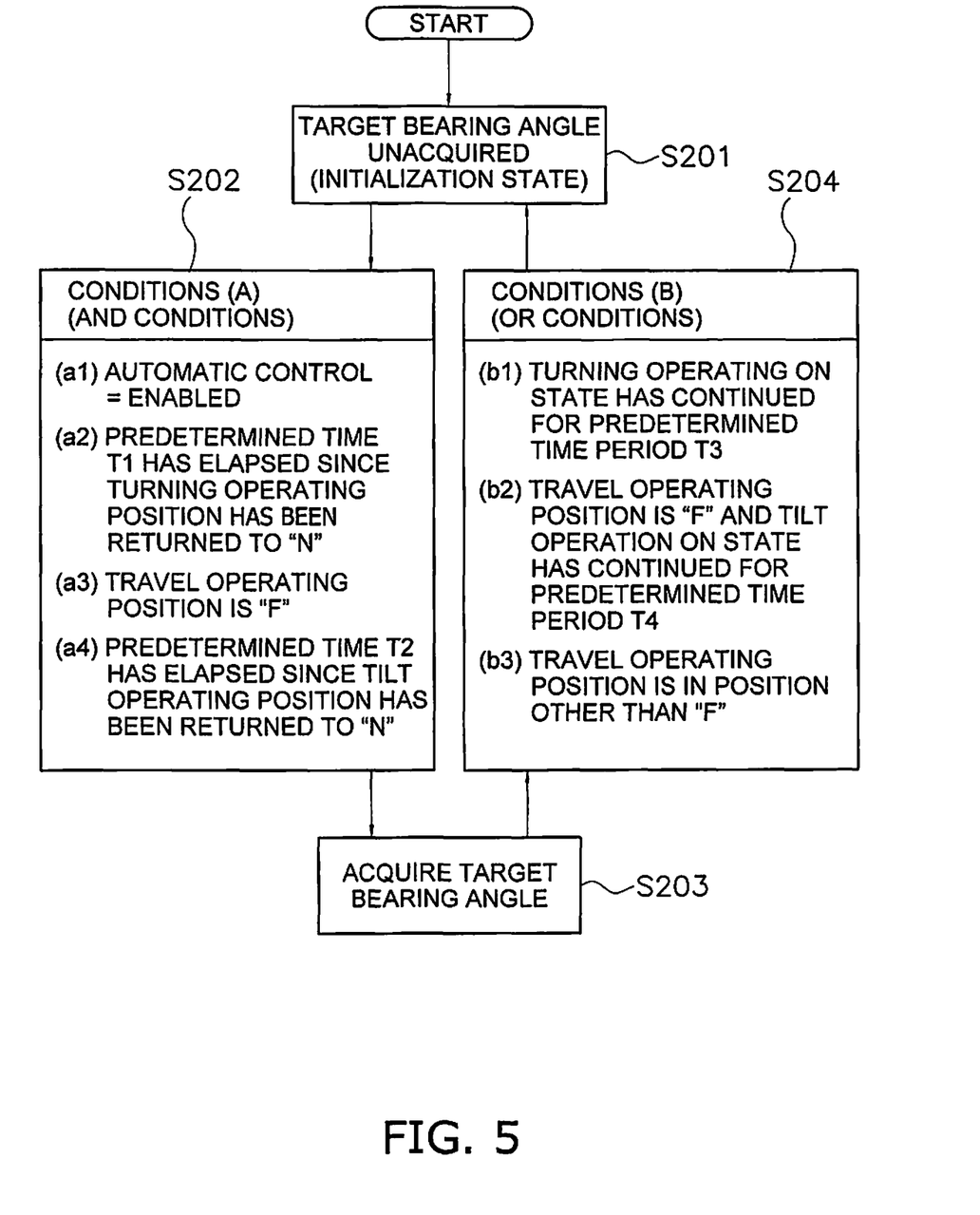
FIG. 5 is a view illustrating processing for deciding a target traveling direction.

FIG. 4 is a flow chart of processing for straight travel correction control. As illustrated in FIG. 4, under the condition that a belowmentioned target bearing angle has been acquired (step S100), the controller 26 decides a target traveling direction in step S101. FIG. 5 is a view illustrating processing for acquiring or resetting the target bearing angle. In step S101, the target bearing angle acquired in the belowmentioned processing is set as the target traveling direction. As illustrated in FIG. 5, during system activation of the work vehicle 1, for example when the ignition is switched ON, the target bearing angle is unacquired (initialization state) in step S201. The straight travel correction control is not executed if the target bearing angle is unacquired. The straight travel correction control is canceled when the target bearing angle is reset when the straight travel correction control illustrated in FIG. 4 is executed.

In the present embodiment, the traveling direction is represented by a bearing angle. For example, if true north is 0 degrees, the bearing angle is represented by a positive angle up to +180 degrees in the clockwise direction and by a negative value up to −180 degrees in the anticlockwise direction. However, when true north is 0 degrees, the bearing angle may be represented a positive angle up to +180 degrees in the anticlockwise direction and by a negative value up to −180 degrees in the clockwise direction. Alternatively, a bearing angle in a direction other than true north may be set as 0 degrees.

In step S202, the controller 26 determines whether target bearing angle acquisition conditions (A) have been met. The conditions (A) include the conditions a1, a2, a3, and a4 depicted below. When the conditions a1, a2, a3 and a4 are met, the controller 26 decides that the conditions (A) have been met. That is, the controller 26 decides that the conditions (A) have been met when all the conditions a1, a2, a3 and a4 are met.

(a1) Automatic control is set to "enable."
(a2) A predetermined time period t1 has elapsed since the turning operating position has been returned to the neutral position.

(a3) The travel operating position is in the forward movement position.
(a4) A predetermined time period t2 has elapsed since the tilt operating position has been returned to neutral.

When the operator uses the input device 25c to set the automatic control to "enable," the controller 26 decides that (a1) has been met. The operator is able to set the automatic control to "enable" or "disable" using the input device 25c. The work vehicle 1 is provided with an excavation mode as one of a plurality of work modes. The automatic control signifies that the travel of the work vehicle 1 and the motions of the work implement 13 in the excavation mode are controlled automatically. The straight travel correction control may be one of a plurality of controls provided under the automatic control.

Conditions (a2) to (a4) indicate that the work vehicle 1 has started straight travel. The controller 26 decides that (a2) has been met when the predetermined time period t1 has elapsed since the first operating device 25a has been returned from the left turn position or the right turn position to the neutral position. The controller 26 decides that (a3) has been met when the first operating device 25a is disposed in the forward movement position. The controller 26 decides that (a4) has been met when the predetermined time period t2 has elapsed since the second operating device 25b has been returned from the left tilt position or the right tilt position to the neutral position.

The predetermined time period t1 and the predetermined time period t2 may be the same or may be different. The predetermined time period t1 and the predetermined time period t2 are set as values to the extent that it is possible to consider that the straight travel of the work vehicle 1 has started. For example, although the predetermined time period t1 and the predetermined time period t2 are short time periods of approximately one second, the predetermined time periods may be shorter than one second or longer than one second.

When the controller 26 decides that the conditions (A) have been met, the controller 26 acquires the target bearing angle in step S203. Specifically, the controller 26 decides the actual bearing angle of the work vehicle 1 when the conditions (A) have been met as the target bearing angle. The controller 26 stores the decided target bearing angle in the storage device 28.

After the target bearing angle has been acquired, in step S204 the controller 26 determines whether target bearing angle initialization conditions (B) have been met. The conditions (B) include conditions b1, b2, and b3 as depicted below. When the conditions b1, b2 or b3 are met, the controller 26 decides that the conditions (B) have been met. That is, when at least one of the conditions b1, b2 and b3 has been met, the controller 26 decides that the conditions (B) have been met.
(b1) A turning operating ON state has continued for a predetermined time period t3.
(b2) The travel operating position is in the forward movement position and a tilt operation ON state has continued for a predetermined time period t4.
(b3) The travel operating position is in a position other than the forward movement position.

The conditions (B) are conditions for indicating the intervention of a manual operation of the operator other than straight travel. The controller 26 decides that (b1) has been met when the predetermined time period t3 has elapsed since the first operating device 25a has been disposed in the left turn position or the right turn position. The controller 26 decides that (b2) has been met when the first operating device 25a is disposed in the forward movement position and the predetermined time period t4 has elapsed since the second operating device 25b has been disposed in the left tilt position or the right tilt position. The controller 26 decides that (b3) has been met when the first operating device 25a is disposed in the reverse movement position or the neutral position.

The predetermined time period t3 and the predetermined time period t4 may be the same or may be different. The predetermined time period t3 and the predetermined time period t4 are set as values to the extent that it is possible to consider that travel other than the straight travel, such as a left or right turn or reverse travel, of the work vehicle 1 has started. For example, although the predetermined time period t3 and the predetermined time period t4 are short time periods of approximately one second, the predetermined time periods may be shorter than one second or longer than one second.

When the controller 26 decides that the conditions (B) have been met, the controller 26 initializes the target bearing angle in step S201. That is, the target bearing angle is returned to the unacquired state.

As described above, in step S101 in FIG. 4, the acquired target bearing angle is set as the target traveling direction. In step S102, the controller 26 acquires the actual traveling direction of the work vehicle 1. As described above, the controller 26 acquires the actual bearing angle of the work vehicle 1 as the actual traveling direction. The controller 26 acquires and updates the actual traveling direction in a predetermined sampling period.

Figure 6:
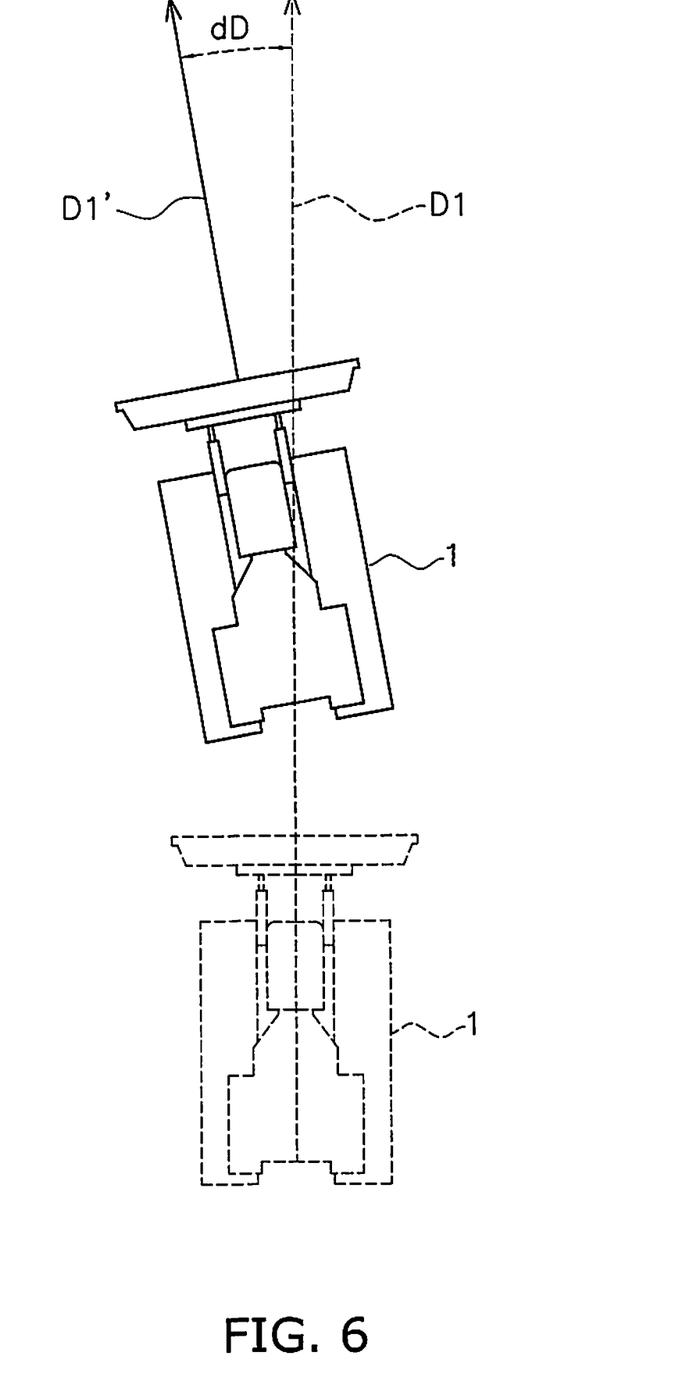
FIG. 6 is a view illustrating a bearing difference between the target traveling direction and the actual traveling direction of the work vehicle.

In step S103, the controller 26 calculates a bearing difference dD. As illustrated in FIG. 6 and formula I, the bearing difference dD is an angular difference between the target traveling direction D1 and the actual traveling direction D1' of the work vehicle 1. In other words, the bearing difference dD is the difference between the target bearing angle and the actual bearing angle of the work vehicle 1.

$$dD = D1 - D1' \qquad \text{[Formula I]}$$

In step S104, the controller 26 determines whether the absolute value of the bearing difference dD is greater than a predetermined first threshold d1. If the absolute value of the bearing difference dD is greater than the predetermined first threshold d1, the processing advances to step S105. If the absolute value of the bearing difference dD is not greater than the predetermined first threshold d1 in step S104, the controller 26 does not perform the straight travel correction control from step S105 onward because the deviation from the target traveling direction is small.

In step S105 and step S106, the controller 26 executes the straight travel correction control. The straight travel correction control is a control for moving the blade 18 by a tilt angle that corresponds to the bearing difference dD so as to reduce the bearing difference dD. In other words, the straight travel correction control is a control for moving the blade 18 such that the actual traveling direction of the work vehicle 1 approaches the target traveling direction.

Figure 7:
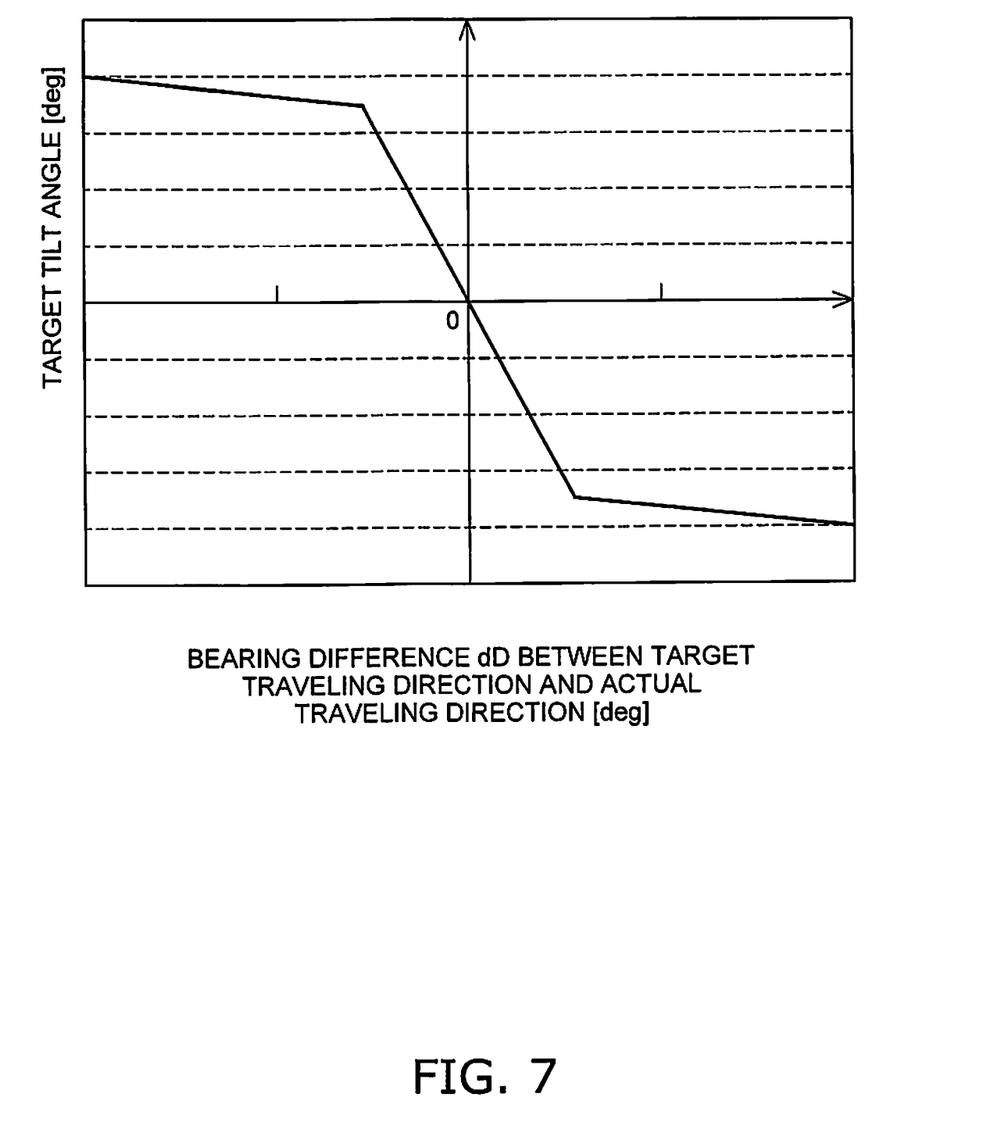
FIG. 7 illustrates an example of target tilt angle data.

Specifically, the controller 26 decides a target tilt angle in step S105. The controller 26 refers to target tilt angle data depicted in FIG. 7 to decide the target tilt angle corresponding to the bearing difference dD. The target tilt angle data is data for defining the bearing difference dD and the target tilt angle corresponding to the bearing difference dD, and is stored in the storage device 28. In FIG. 7, the horizontal axis represents the bearing difference dD and the vertical axis represents the target tilt angle.

In FIG. 7, a bearing difference dD of a positive value, for example, indicates that the actual traveling direction of the work vehicle 1 deviates to the left with respect to the target traveling direction. A target tilt angle of a negative value represents a right tilt motion. Therefore, the controller 26 sets the target tilt angle for a right tilt motion when the actual traveling direction deviates to the left with respect to the target traveling direction.

The bearing difference dD of a negative value indicates that the actual traveling direction of the work vehicle 1 deviates to the right with respect to the target traveling direction. A target tilt angle of a positive value represents a left tilt motion. Therefore, the controller 26 sets the target tilt angle for a left tilt motion when the actual traveling direction deviates to the right with respect to the target traveling direction.

Furthermore, as illustrated with the target tilt angle data in FIG. 7, a small absolute value of the bearing difference exhibits a larger rate of change of the target tilt angle than a large absolute value of the bearing difference. Consequently, the actual traveling direction of the work vehicle 1 can be returned to the target traveling direction while the deviation from the target traveling direction is small.

However, the target tilt angle data is not limited to the data illustrated in FIG. 7 and may be modified. For example, the bearing difference dD of a positive value may indicate that the actual traveling direction of the work vehicle 1 deviates to the left with respect to the target traveling direction. The bearing difference dD of a negative value may indicate that the actual traveling direction of the work vehicle 1 deviates to the right with respect to the target traveling direction. A target tilt angle of a positive value may represent a right tilt motion. A target tilt angle of a negative value may represent a left tilt motion.

In step S106, the controller 26 controls the tilt cylinders 35 and 36. The controller 26 controls the control valve 27 and moves the tilt cylinders 35 and 36 so that the tilt angle of the blade 18 becomes the target tilt angle. For example, the controller 26 causes a right tilt motion by the target tilt angle corresponding to the bearing difference dD when the actual traveling direction deviates to the left with respect to the target traveling direction. As a result, the bearing difference dD approaches zero and the actual traveling direction is corrected. The controller 26 causes a left tilt motion by the target tilt angle corresponding to the bearing difference dD when the actual traveling direction deviates to the right with respect to the target traveling direction. As a result, the bearing difference dD approaches zero and the actual traveling direction is corrected.

In step S107, the controller 26 determines whether the absolute value of the bearing difference dD is less than a predetermined second threshold d2. The second threshold d2 is preferably less than the first threshold d1. If the absolute value of the bearing difference dD is less than the predetermined second threshold d2, the processing advances to step S108.

During the processing from step S105 to step S107, the controller 26 repeats the steps of deciding the target traveling direction in step S101, acquiring the actual traveling direction is step S102, and calculating the bearing difference dD in step S103 in a predetermined sampling period. Consequently, the controller 26 updates the bearing difference dD and executes the steps S105 to S107 on the basis of the updated bearing difference dD. The straight travel correction control is maintained until the bearing difference dD falls below the predetermined second threshold d2.

In step S108, the controller 26 completes the straight travel correction control. That is, the controller 26 stops moving the blade 18 by the tilt angle corresponding to the bearing difference dD.

When the actual traveling direction of the work vehicle 1 deviates from the target traveling direction, the controller 26 corrects the traveling direction of the work vehicle 1 by moving the blade 18 so as to reduce the bearing difference dD in the control system 3 of the work vehicle 1 according to the present embodiment as explained above.

Figure 8:
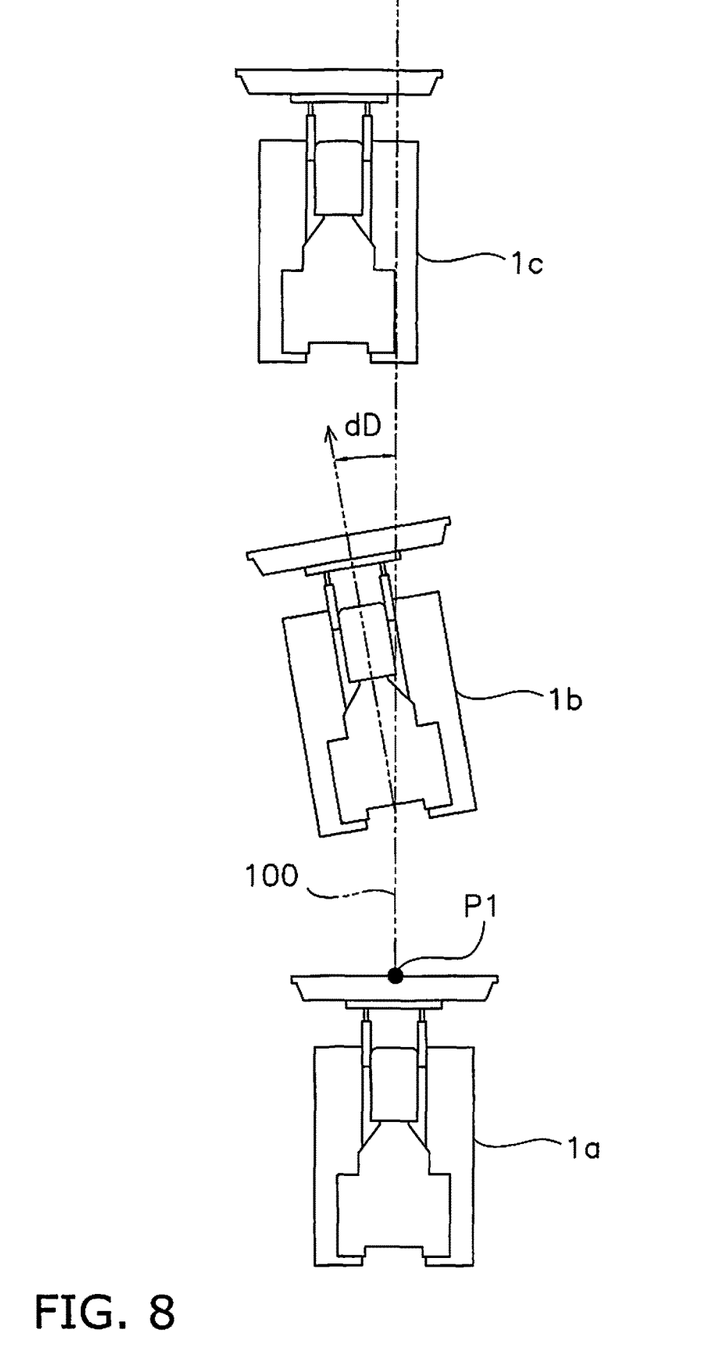
FIG. 8 illustrates an example of a correction of the traveling direction of the work vehicle.

As illustrated in FIG. 8 for example, at a point P1, the operator switches the first operating device 25*a* to the forward movement position and the work vehicle 1 travels forward. At this time, the work vehicle 1 starts to move along a straight path 100 (1*a* in FIG. 8). The controller 26 sets the actual traveling direction of the work vehicle 1 at the start of straight travel, as the target traveling direction. Next, when the traveling direction of the work vehicle 1 deviates from the target traveling direction (1*b* in FIG. 8), the controller 26 refers to the target tilt angle data depicted in FIG. 7 to decide the target tilt angle corresponding to the bearing difference dD. The controller 26 then controls the work implement 13 so that the blade 18 moves by the target tilt angle. As a result, the traveling direction of the work vehicle 1 is corrected so that the traveling direction of the work vehicle 1 matches the target traveling direction (1*c* in FIG. 8).

Therefore, in comparison to when the work vehicle 1 returns to the former straight path 100, the degree of turning and traveling in order to correct the traveling direction is smaller with the control system 3 of the work vehicle 1 according to the present embodiment. Consequently, the work vehicle 1 travels in the target traveling direction with high accuracy and a reduction in work efficiency can be suppressed.

Although the embodiment of the present invention has been described so far, the present invention is not limited to the above embodiment and various modifications may be made within the scope of the invention.

The work vehicle 1 is not limited to a bulldozer, and may be another type of work vehicle such as a wheel loader or a motor grader and the like.

The work vehicle 1 may be remotely operated. In this case, a portion of the control system 3 may be disposed outside of the work vehicle 1. For example, the controller 26 may be disposed outside the work vehicle 1. The controller 26 may be disposed inside a control center separated from the work site. The operating devices 25*a*, 25*b* and the input device 25*c* may be disposed outside of the work vehicle 1. In this case, the operating cab may be omitted from the work vehicle 1. The work vehicle 1 may be operated with only the automatic control by the controller 26 without operations by the operating devices 25*a*, 25*b* or the input device 25*c*.

Figure 9:
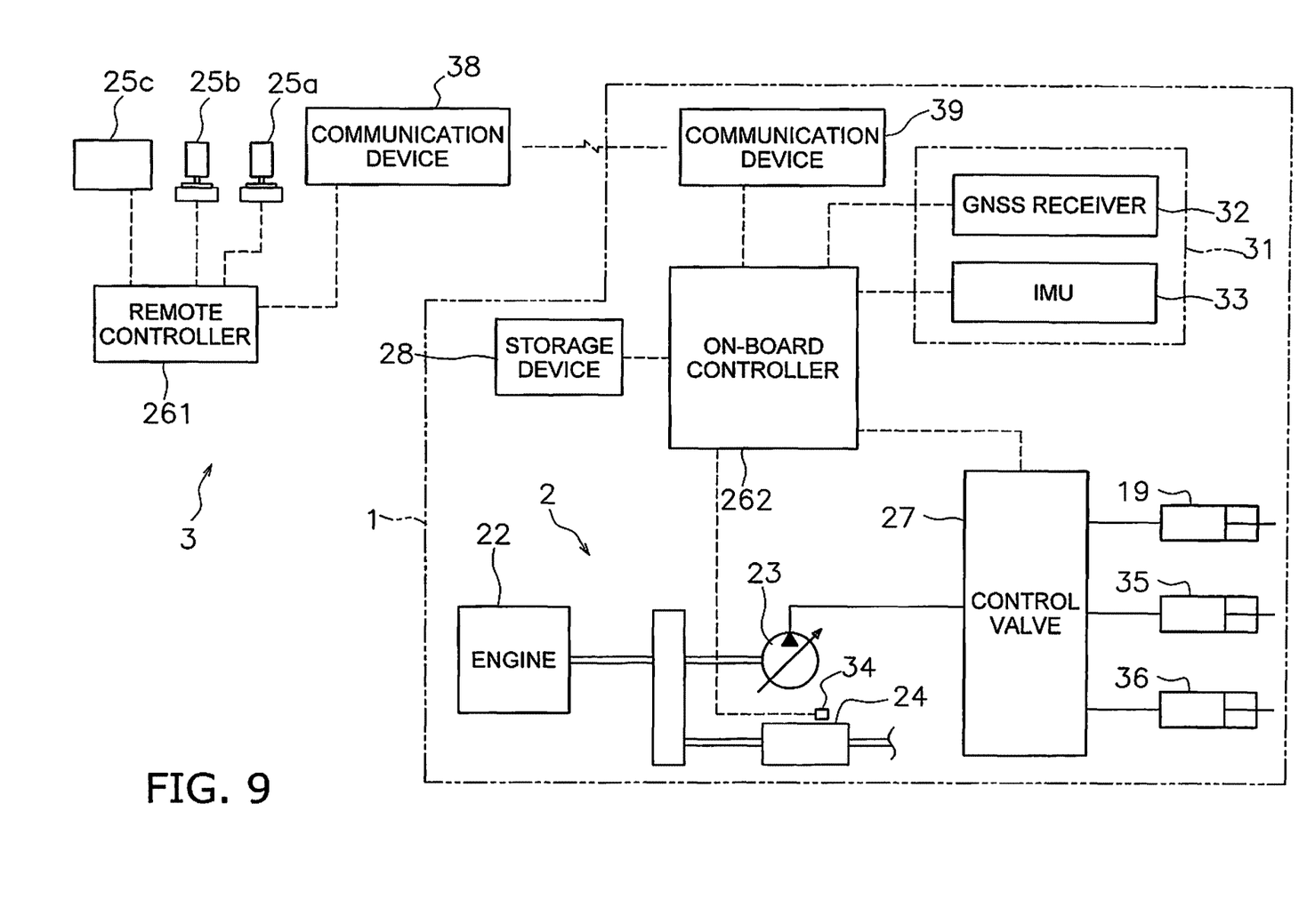
FIG. 9 is a block diagram of a control system of the work vehicle according to another embodiment.

The controller 26 may have a plurality of controllers separated from each other. For example as illustrated in FIG. 9, the controller 26 may include a remote controller 261 disposed outside of the work vehicle 1 and an on-board controller 262 mounted on the work vehicle 1. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262.

The acquisition conditions (A) of the target bearing angle may be modified. For example, a portion of the conditions a1, a2, a3, and a4 may be omitted or may be modified.

Alternatively, another condition may be added to the acquisition conditions (A). The initialization conditions (B) of the target bearing angle may be modified. For example, a portion of the conditions b1, b2, and b3 may be omitted or may be modified. Alternatively, another condition may be added to the initialization conditions (B).

In the above embodiment, the straight travel correction control is executed from steps S105 onward if the bearing difference dD is greater than the predetermined first threshold d1 in step S104. However, another condition may be added as a starting condition of the straight travel correction control. For example, the starting condition of the straight travel correction control may include the fact that the straight travel correction control is set to "enable" with the input device 25c. Furthermore, the starting condition of the straight travel correction control may include the fact that the state of a tractive force of the work vehicle 1 being greater than a predetermined threshold f1 continues for a predetermined time period. The starting condition of the straight travel correction control may include the abovementioned conditions as AND conditions.

In this case, the controller 26 may calculate the tractive force from a detection value of the output sensor 34. For example, if the power transmission device 24 of the work vehicle 1 is an HST device, the controller 26 is able to calculate the tractive force from the driving hydraulic pressure of the hydraulic motor and the rotation speed of the hydraulic motor. Alternatively, if the power transmission device 24 has a torque converter and a transmission, the controller 26 is able to calculate the tractive force from the input torque to the transmission and the speed reduction ratio of the transmission. The input torque to the transmission can be calculated from the output rotation speed of the torque converter. However, the method for detecting the tractive force is not limited to the methods described above and may be detected using another method.

In the above embodiment, the controller 26 completes the straight travel correction control when the bearing difference dD is less than the predetermined second threshold d2 in step S107. However, another condition may be added as a completion condition of the straight travel correction control. For example, the completion condition of the straight travel correction control may include the fact that the straight travel correction control is set to disable with the input device 25c. Furthermore, the completion condition of the straight travel correction control may include the fact that the state of a tractive force of the work vehicle 1 being less than a predetermined threshold f2 continues for a predetermined time period. The completion condition of the straight travel correction control may include the above conditions as OR conditions. The threshold f2 is preferably smaller than the threshold f1, but may also be the same.

INDUSTRIAL APPLICABILITY

In the present invention, the work vehicle is able to travel in the target traveling direction with high accuracy and a reduction in work efficiency can be suppressed.

What is claimed is:

1. A control system for a work vehicle including a work implement, the control system comprising:
   a sensor that outputs a signal indicating an actual travel direction of the work vehicle;
   a controller that communicates with the sensor, the controller being configured to acquire the actual traveling direction of the work vehicle,
   set the actual traveling direction as a target traveling direction when a condition that indicates that the work vehicle has started straight travel has been met,
   calculate a bearing difference between the target travel direction and the actual travel direction, and
   move the work implement by a target tilt angle corresponding to the bearing difference so as to reduce the bearing difference; and
   a storage device storing target tilt angle data defining a relationship between the bearing difference and the target tilt angle, the controller being further configured to decide the target tilt angle corresponding to the bearing difference by referring to the target tilt angle data, and
   a first bearing difference exhibiting a larger rate of change of the target tilt angle than a second bearing difference in the target tilt angle data, the first bearing difference being smaller than the second bearing difference.

2. The control system for the work vehicle according to claim 1, wherein
   the condition includes at least an elapse of a predetermined time period during which the tilt angle of the work implement is constant.

3. The control system for the work vehicle according to claim 1, wherein
   the work implement includes
   a blade,
   a left tilt cylinder connected to the blade, and
   a right tilt cylinder connected to the blade.

4. The control system for the work vehicle according to claim 1, wherein
   the controller is further configured to
   determine whether the bearing difference is greater than a predetermined threshold, and move the work implement by the target tilt angle corresponding to the bearing difference when the bearing difference is larger than the predetermined threshold.

5. A method executed by a controller in order to control a traveling direction of a work vehicle including a work implement, the method comprising:
   acquiring an actual traveling direction of the work vehicle;
   determining whether a condition which indicates that the work vehicle has started straight travel has been met;
   setting the actual traveling direction as a target traveling direction when the condition has been met;
   calculating a bearing difference between the target traveling direction and the actual traveling direction;
   determining the target tilt angle corresponding to the bearing difference by referring to the target tilt angle data defining a relationship between the bearing difference and the target tilt angle, a first bearing difference exhibiting a larger rate of change of the target tilt angle than a second bearing difference in the target tilt angle data, the first bearing difference being smaller than the second bearing difference; and
   moving the work implement by the target tilt angle corresponding to the bearing difference so as to reduce the bearing difference.

6. The method according to claim 5, further comprising:
   determining whether the bearing difference is greater than a predetermined threshold; and
   moving the work implement by the target tilt angle corresponding to the bearing difference when the bearing difference is larger than the predetermined threshold.

7. A work vehicle comprising:
a work implement;
a sensor that outputs a signal indicating an actual traveling direction of the work vehicle,
a controller that communicates with the sensor, the controller being configured to acquire the actual traveling direction of the work vehicle,
set the actual traveling direction as a target traveling direction when a condition that indicates that the work vehicle has started straight travel has been met,
calculate a bearing difference between the target travel direction and the actual travel direction, and
move the work implement by a target tilt angle corresponding to the bearing difference so as to reduce the bearing difference, and
a storage device storing target tilt angle data defining a relationship between the bearing difference and the target tilt angle, the controller being further configured to decide the target tilt angle corresponding to the bearing difference by referring to the target tilt angle data, and
a first bearing difference exhibiting a larger rate of change of the target tilt angle than a second bearing difference in the target tilt angle data, the first bearing difference being smaller than the second bearing difference.

8. A work vehicle according to claim 7, wherein
the work implement includes
a blade,
a left tilt cylinder connected to the blade, and
a right tilt cylinder connected to the blade.

9. The work vehicle according to claim 8, wherein,
the controller is further configured to
determine whether the bearing difference is greater than a predetermined threshold, and
move the work implement by the target tilt angle corresponding to the bearing difference when the bearing difference is larger than the predetermined threshold.

* * * * *